(12) United States Patent
Kankainen et al.

(10) Patent No.: US 10,148,884 B2
(45) Date of Patent: Dec. 4, 2018

(54) FACILITATING CAPTURING A DIGITAL IMAGE

(71) Applicant: Microsoft Technology Licensing, LLC, Redmond, WA (US)

(72) Inventors: Mikko Kankainen, Helsinki (FI); Jukka Miettinen, Järvenpää (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/224,248

(22) Filed: Jul. 29, 2016

(65) Prior Publication Data

US 2018/0035055 A1    Feb. 1, 2018

(51) Int. Cl.
| | |
|---|---|
| H04N 5/232 | (2006.01) |
| G06F 3/0485 | (2013.01) |
| G06K 9/00 | (2006.01) |
| H04N 1/21 | (2006.01) |
| H04N 5/262 | (2006.01) |

(52) U.S. Cl.
CPC ....... *H04N 5/23293* (2013.01); *G06F 3/0485* (2013.01); *G06K 9/00221* (2013.01); *H04N 1/215* (2013.01); *H04N 5/23216* (2013.01); *H04N 5/23219* (2013.01); *H04N 5/23222* (2013.01); *H04N 5/2621* (2013.01)

(58) Field of Classification Search
CPC .......... H04N 5/23293; H04N 5/23216; G06K 9/00221; G06F 3/0485
USPC ................ 348/220.1, 221.1, 222.1
See application file for complete search history.

(56) References Cited

U.S. PATENT DOCUMENTS

| | | | |
|---|---|---|---|
| 5,291,889 A | 3/1994 | Kenet et al. | |
| 6,657,667 B1 | 12/2003 | Anderson | |
| 6,677,967 B2 | 1/2004 | Sawano et al. | |
| 7,237,197 B2 | 6/2007 | Camara | |
| 8,013,304 B2 | 9/2011 | Haigh et al. | |
| 8,072,504 B2 | 12/2011 | Hunter et al. | |
| 8,085,318 B2 | 12/2011 | Ciudad et al. | |
| 9,106,821 B1 | 8/2015 | Baldwin et al. | |
| 9,294,670 B2 | 3/2016 | Jafarzadeh et al. | |
| 2007/0237421 A1* | 10/2007 | Luo | G06T 11/60 382/284 |
| 2010/0272363 A1 | 10/2010 | Steinberg et al. | |

(Continued)

FOREIGN PATENT DOCUMENTS

EP    2712176 A1    3/2014

OTHER PUBLICATIONS

Widder, Brandon, "Treat yo selfie with one of these 10 apps made to beautify your pics", Published on: Apr. 12, 2015, 6 pages, Available at: http://www.digitaltrends.com/photography/best-selfie-apps/.

(Continued)

*Primary Examiner* — Yogesh Aggarwal

(57) ABSTRACT

According to one aspect, there is provided an apparatus comprising at least one processing unit and at least one memory. The at least one memory stores program instructions that, when executed by the at least one processing unit, cause the apparatus to obtain a set of captured still images captured with a camera, detect at least one face in the captured still images, and cause display of the detected at least one face on a display providing a live viewfinder feed of a scene to be captured as an additional display element while providing the live viewfinder feed on the display.

20 Claims, 4 Drawing Sheets

(56) References Cited

U.S. PATENT DOCUMENTS

| | | | |
|---|---|---|---|
| 2012/0113216 A1 | 5/2012 | Seen et al. | |
| 2014/0085499 A1* | 3/2014 | Na | H04N 1/215 348/222.1 |
| 2014/0176764 A1 | 6/2014 | Nakamura et al. | |
| 2014/0184858 A1* | 7/2014 | Yu | H04N 5/23293 348/241 |
| 2014/0267723 A1 | 9/2014 | Davidson et al. | |
| 2015/0177937 A1 | 6/2015 | Poletto et al. | |
| 2015/0278979 A1* | 10/2015 | Min | G06K 9/00523 382/195 |
| 2017/0374280 A1* | 12/2017 | Chan | H04N 5/23222 |

OTHER PUBLICATIONS

"International Search Report and Written Opinion Issued in PCT Application No. PCT/US2017/042962", dated Sep. 28, 2017, 10 Pages.

* cited by examiner

FACILITATING CAPTURING A DIGITAL IMAGE

BACKGROUND

Digital imaging enables taking a plurality of digital images comprising a desired target or targets in order to end up to a satisfying image. Often a target scene involves several persons, and this causes additional challenges in order to capture a satisfying image. A digital image should be captured at a moment when facial expressions (for example, all persons are smiling and eyes of all persons are open) of each of the persons are satisfactory. But, as the number of persons in a digital still image to be taken increases, the task of capturing a satisfying digital still image becomes more and more challenging.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, an apparatus is provided. The apparatus comprises at least one processing unit and at least one memory. The at least one memory stores program instructions that, when executed by the at least one processing unit, cause the apparatus to obtain a set of captured still images captured with a camera, detect at least one face in the captured still images, and cause display of the detected at least one face on a display providing a live viewfinder feed of a scene to be captured as an additional display element while providing the live viewfinder feed on the display.

According to another embodiment, an apparatus is provided. The apparatus comprises at least one processing unit and at least one memory. The at least one memory stores program instructions that, when executed by the at least one processing unit, cause the apparatus to obtain a set of captured still images captured with a camera, detect a face of a person in the captured still images, automatically select without user input a candidate face for the person from the detected faces for the person in the captured still images, and cause display of the selected candidate face on a display providing a live viewfinder feed of a scene to be captured, the selected candidate face replacing the face of the person in the live viewfinder feed on the display.

According to another embodiment, a method is provided. The method comprises obtaining a set of captured still images captured using an apparatus comprising a camera, detecting a face of a person in the captured still images, automatically selecting without user input a candidate face for the person face from the detected faces for the person in the captured still images, and causing display of the selected candidate face on a display providing a live viewfinder feed of a scene to be captured, the selected candidate face replacing the face of the person in the live viewfinder feed on the display Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
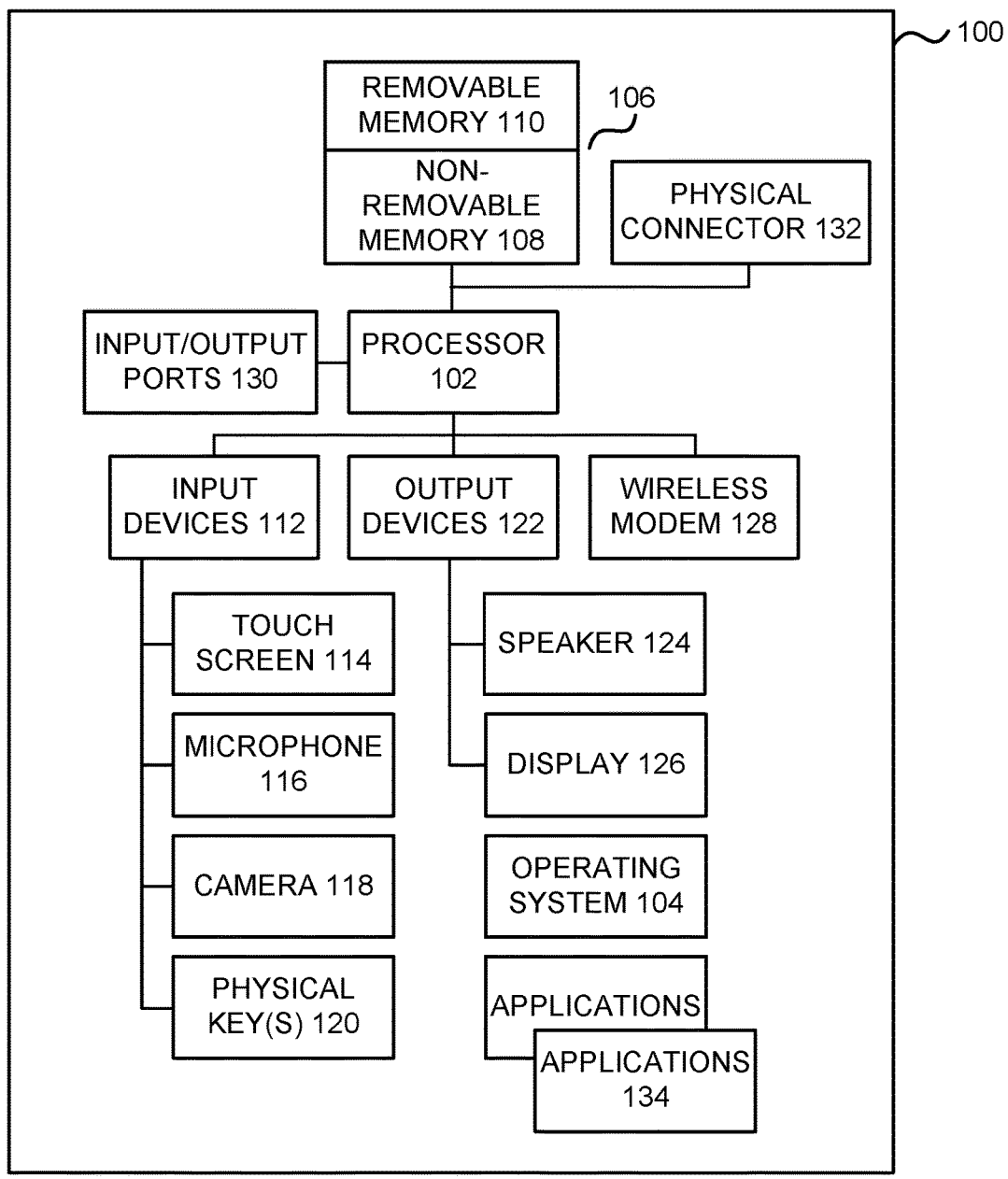
FIG. 1 is a system diagram depicting an apparatus including a variety of optional hardware and software components.

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

When a desired photographing scene comprises multiple persons, it becomes difficult to record with a digital camera in a single digital still image where especially facial expressions of each of the persons are satisfactory. One way to address this problem is to take several digital still images relating of the same scene and then later select the one that is the best. Another way to address this problem is to start from one of the digital still images and post-process it with a suitable software application in order to end up with a satisfying end result. Various embodiments are illustrated for facilitating capturing and storing a digital still image where facial expressions of persons in the photographed scene are satisfactory.

In at least some embodiments a solution is provided where a display providing a live viewfinder feed of a scene to be captured displays detected faces from a set of previously captured still images while still showing the live viewfinder feed of the scene to be captured on the display. This allows inspecting the captured results while still maintaining the live viewfinder feed on the display. Thus, a user is in real-time able to determine whether facial expressions in an already captured image were satisfactory.

Further, at least some of the illustrated embodiments provide a solution where an apparatus may automatically without user actions select a candidate face for a person from a set of detected faces for the person in the previously captured still images. The selected candidate face is then displayed on a display providing a live viewfinder feed of a scene to be captured, and the selected candidate face replaces the face of the person in the live viewfinder feed on the display. This enables an automatic selection of candidate faces for some or all persons in a scene, and a digital still image comprising the candidate faces may be stored where the candidate faces may have been taken from several different captured digital still images.

In the following description, the term "live viewfinder feed" refers, for example, to live image data of a scene to be captured or photographed and displayed on the display. Thus, when a user capturing images with the apparatus changes the shooting direction of the camera, a corresponding change of the scene to be captured is seen on the display. Further, the term "additional display element" refers, for example, to a section on the display providing the live viewfinder feed. The additional display element is configured to display still image data (comprising the detected at least one face) while still elsewhere on the display displaying the live viewfinder feed of the scene to be captured. Further, in the following description, the term "candidate face" refers, for example, to a face of a person in a digital image where the face is regarded as a possible alternative for replacing the face of the same person in the live viewfinder feed.

FIG. 1 is a system diagram depicting an apparatus 100 including a variety of optional hardware and software components. Any components in the apparatus 100 can communicate with any other component, although not all connections are shown, for ease of illustration. The apparatus 100 can be any of a variety of computing devices (for example, a cell phone, a smartphone, a handheld computer, a tablet computer, a Personal Digital Assistant (PDA), a network server etc.).

The illustrated apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components and support for one or more application programs 134. The application programs can include common mobile computing applications (e.g., email applications, calendars, contact managers, web browsers, messaging applications), or any other computing application.

The illustrated apparatus 100 can include a memory 106. The memory 106 can include non-removable memory 108 and/or removable memory 110. The non-removable memory 108 can include RAM, ROM, flash memory, a hard disk, or other well-known memory storage technologies. The removable memory 110 can include flash memory or a Subscriber Identity Module (SIM) card, which is well known in mobile communication systems, or other well-known memory storage technologies, such as "smart cards". The memory 106 can be used for storing data and/or code for running the operating system 104 and the applications 134. If the apparatus 100 is a mobile phone or smart phone, the memory 106 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The apparatus 100 can support one or more input devices 112, such as a touchscreen 114, microphone 116, camera 118 and/or physical keys or a keyboard 120 and one or more output devices 122, such as a speaker 124 and a display 126. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 134 can comprise speech-recognition software as part of a voice user interface that allows a user to operate the apparatus 100 via voice commands. Further, the apparatus 100 can comprise input devices and software that allows for user interaction via a user's spatial gestures, such as detecting and interpreting gestures to provide input to a gaming application.

A wireless modem 128 can be coupled to an antenna (not shown) and can support two-way communications between the processor 102 and external devices, as is well understood in the art. The modem 128 is shown generically and can include a cellular modem for communicating with the mobile communication network and/or other radio-based modems (e.g., Bluetooth or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile apparatus and a public switched telephone network (PSTN) etc.

The apparatus 100 can further include at least one input/output port 130 and/or a physical connector 132, which can be a USB port, a USB-C port, IEEE 1394 (FireWire) port, and/or RS-232 port. The illustrated components are not required or all-inclusive, as any components can be deleted and other components can be added.

Any combination of the illustrated components disclosed in FIG. 1, for example, at least one of the processor 102 and the memory 106 may constitute means for obtaining a set of captured still images captured with a camera, means for detecting at least one face in the captured still images, and means for causing display of the detected at least one face on a display providing a live viewfinder feed as an additional display element while providing the live viewfinder feed on the display. Any combination of the illustrated components disclosed in FIG. 1, for example, at least one of the processor 102, the memory 106, the display 126 and the touch screen 114 may also constitute means for obtaining a set of captured still images captured with a camera, means for detecting at least one face in the captured still images, and means for causing display of the detected at least one face on a display providing a live viewfinder feed of a scene to be captured as an additional display element while providing the live viewfinder feed on the display. Further, any combination of the illustrated components disclosed in FIG. 1, for example, at least one of the processor 102, the memory 106, the display 126 and the touch screen 114 may also constitute means for obtaining a set of captured still images captured with a camera, means for detecting a face of a person in the captured still images, means for automatically selecting without user input a candidate face for the person from the detected faces for the person in the captured still images, and means for causing display of the selected candidate face on a display providing a live viewfinder feed of a scene to be captured, the selected candidate face replacing the face of the person in the live viewfinder feed on the display.

Figure 2A:
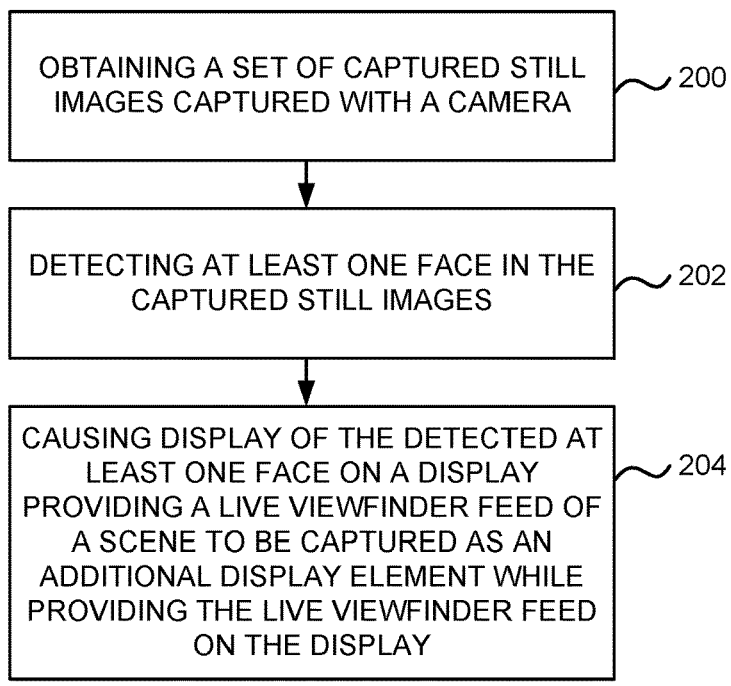
FIG. 2A is a flow diagram illustrating a method for facilitating capturing digital still images according to one embodiment.

FIG. 2A is a flow diagram illustrating a method for facilitating capturing digital still images according to one embodiment. The method may be performed by at least one processor and at least one memory storing program instructions executable by the at least one processor. The at least one processor may also control operations of other device elements, for example, a camera or a display.

At 200, a set of still images captured with a camera is obtained. An apparatus, for example, a mobile device, a tablet computer, a smart phone, may comprise the camera or the apparatus may be a digital camera. At 202 at least one face is detected in the captured still images. The face detection may be performed on a full resolution image captured by the camera or on a lower resolution image used is displaying a live viewfinder feed on a display of the apparatus or the camera. Further, the face detection may be performed using any technique or algorithm that is able to find a face from a digital image. At 204 display of the detected at least one face is caused on the display providing the live viewfinder feed of a scene to be captured as an additional display element while providing the live viewfinder feed on the display. This means that in addition to providing the normal live viewfinder feed, the display additionally displays digital still images comprising faced detected in the captured images. This allows inspecting the capturing results while still maintaining the live viewfinder feed on the display.

Figure 2B:
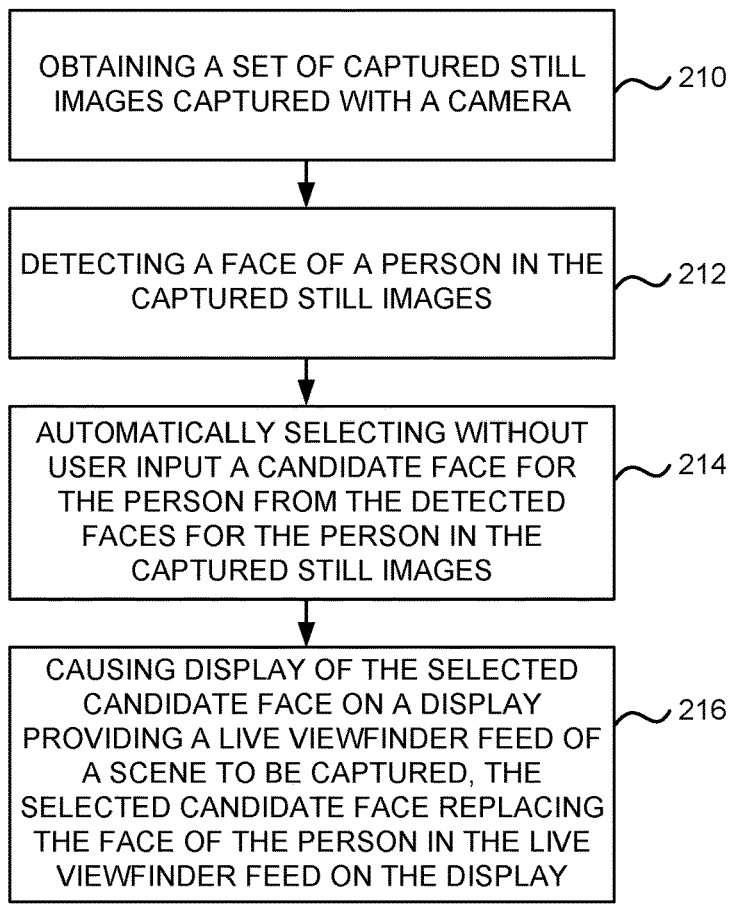
FIG. 2B is a flow diagram illustrating a method for facilitating capturing digital still images according to one embodiment.

FIG. 2B is a flow diagram illustrating a method for facilitating capturing digital still images according to one embodiment. The method may be performed by at least one processor and at least one memory storing program instructions executable by the at least one processor. The at least one processor may also control operations of other device elements, for example, a camera or a display.

At 210, a set of captured still images captured with a camera is obtained. An apparatus, for example, a mobile device, a tablet computer, a smart phone, may comprise the camera or the apparatus may be a digital camera. At 212 a face of a person is detected in the captured still images. The face detection may be performed on a full resolution image captured by the camera or on a lower resolution image used is displaying a live viewfinder feed in a display of the apparatus or the camera. Further, the face detection may be performed using any technique or algorithm that is able to find a face from a digital image. At 214 a candidate face for the person from the detected faces for the person in the captured still images is automatically selected without user input. At 216 display of the selected candidate face is caused on the display providing the live viewfinder feed of a scene to be captured, the selected candidate face replacing the face of the person in the live viewfinder feed on the display. This enables "locking" in the live viewfinder feed a face that is considered to be satisfactory (for example, a person is smiling and his eyes are clearly open).

Figure 3A:
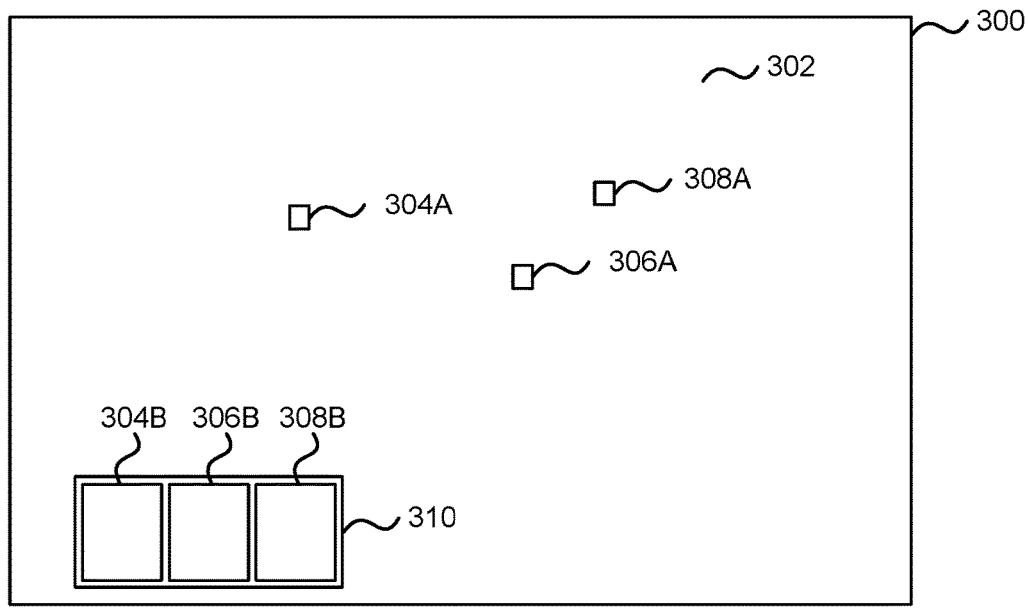
FIG. 3A is a simplified live viewfinder feed provided on a display of a camera apparatus according to one embodiment.

FIG. 3A illustrates a view on a display of an apparatus according to one embodiment. The apparatus may be any apparatus comprising a digital camera, for example, a computer, a tablet computer, a smart phone, a digital camera etc.

A display 300 of the apparatus provides a live viewfinder 302 providing a live view or feed of a scene to be photographed. In other words, when a user changes the shooting direction with the apparatus, the live view feed of a scene to be captured in the live viewfinder 302 changes accordingly.

FIG. 3A illustrates a simplified example where rectangles 304A, 306A, 308A represent faces within a scene to be captured or photographed. A set of captured digital still images is obtained using the digital camera. The captured digital still images may be captured in response to user initiation or automatically without user actions. Face detection may be performed based on the full resolution image or alternatively on lower resolution images displayed by the live viewfinder 302, and any possible process or technique for detecting the faces from the captured images may be used.

The live viewfinder 302 comprises a display element 310 configured to display the detected faces as still images. The faces may be zoomed versions of the faces while displayed in the display element 310. When the faces are displayed as still images in the display element 310, the remaining part of the live viewfinder 302 continues to display a live feed of the scene to be captured or photographed.

In one embodiment, the display element 310 displays faces from the latest captured digital still image. In another embodiment, the apparatus may be configured to display a face for each person that is, based on an analysis of the various faces relating to each person, considered to be the best alternative. The face analysis may be based on at least one of the following: a posing angle, smiling level, and eye opening status of the faces.

Further, by providing zoomed still image versions of the faces in the captured digital image with the display element 310, the user is given valuable information to decide whether he needs to capture a new digital still image or not. For example, the user may determine based on the zoomed faces in the display element 310 that all the persons in the latest digital image were smiling and their eyes were open and that there is no need to take a new picture. On the other hand, if the user decides based on the zoomed faces in the display element 310 that too many persons had their eyes closed, the user may decide to take a new picture.

Figure 3B:
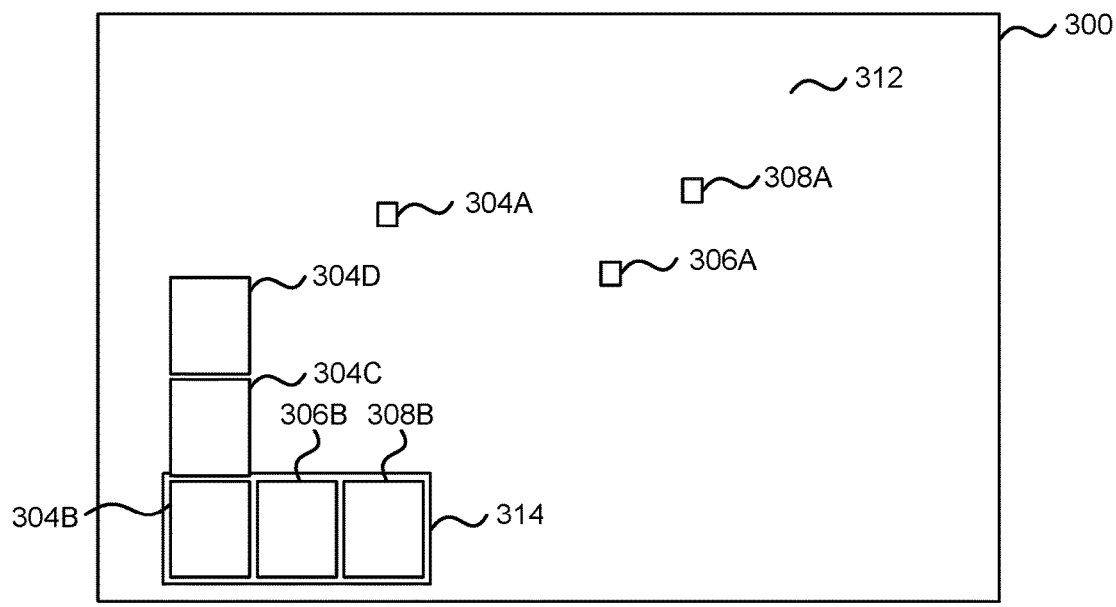
FIG. 3B is a simplified live viewfinder feed provided on a display of a camera apparatus according to another embodiment.

FIG. 3B illustrates a view on a display of an apparatus according to another embodiment. The apparatus may be any apparatus comprising a digital camera, for example, a computer, a tablet computer, a smart phone, a digital camera etc. A display of the apparatus provides a live viewfinder 312 providing a live view feed of a scene to be photographed. In other words, when a user changes the shooting direction with the apparatus, the live view feed in the live viewfinder 312 changes accordingly.

FIG. 3B illustrates a simplified example where rectangles 304A, 306A, 308A represent faces within a scene to be captured photographed. A set of captured image is obtained using the digital camera. The captured digital still images may be captured in response to user initiation or automatically without user actions. Face detection may be performed based on the full resolution image or alternatively on lower resolution images displayed by the live viewfinder 312, and any possible process or technique for detecting the faces from the captured images may be used.

The live viewfinder 312 comprises a display element 314 configured to display the detected faces as still images. When the faces are displayed as still images in the display element 314, the remaining part of the live viewfinder 312 continues to display a live feed about the scene to be photographed.

In one embodiment, the display element 314 displays faces from previously captured digital images. By providing zoomed still image versions of faces in the captured digital still image with the display element 314, the user is given valuable information to decide whether he needs to capture a new digital image or not.

In the embodiment of FIG. 3B, the display element 314 is configured to provide multiple still image versions for the face of a specific person. Faces in still images 304B, 304C, 304D relate to the same user whose face is represented by the rectangle 304A within the scene to be captured or photographed. When the user provides a user action, for example, touches the still image 304B on a touch-sensitive display of the apparatus, the user will be given also other digital still image candidates 304C, 304D to be selected. Depending on a display size of the touch-sensitive display, the number of simultaneously displayed digital still image candidates 304B, 304C, 304D may vary. In FIG. 3B, three digital still image candidates are displayed at a time. Each of the three still image candidates 304B, 304C, 304D has been taken from a different captured image. Although only three still image candidates 304B, 304C, 304D are displayed at a time and if there are more than three candidates available, the user may scroll though the images by providing, for example, a sliding operation with his finger on any of the three still image candidates 304B, 304C, 304D.

When the user selects one of the still image candidates 304B, 304C, 304D, for example, the still image 304D by touching the still image 304D with a finger, the remaining candidates may disappear and the still image 304D may be displayed in the display element 314 for this person. The selection indicates that the user wishes to use the digital still image 304D for the person indicated by the rectangle 304B. In one embodiment, when the user selects the digital still image 304D, the digital still image 304D is also locked into the live viewfinder feed thus replacing the live face of this specific person.

The user may repeat the selection procedure also for the remaining digital still image candidates 306B, 308B corresponding to the rectangles 306A, 308A representing faces of other persons.

In one embodiment, the display element 314 may display the faces after an analysis. The apparatus may be configured to analyze the detected faces of each person in the captured still images and sort or rank the set of candidate faces for each person based on the analysis. For example, the analysis may be based on at least one of the following: a posing angle, smiling level, and eye opening status. As an example, the apparatus may have stored 10 images, thus resulting in 10 candidate faces for a specific user. Based on the analysis, the apparatus may be configured to sort or rank the candidate faces to a specific order. In one embodiment, all the candidate faces as given as alternatives in a sorted or ranked order for a user of the apparatus. In another embodiment, the apparatus may be configured to provide only a subset of the full set of candidate faces for each person with the display element 314.

Once all the necessary selections have been made, the user may provide an indication with the apparatus that a digital still image is to be stored by the apparatus with the selections made by the user. The indication may be provided, for example, via the touch-sensitive display by selecting a button displayed on the touch-sensitive display. The stored image data may thus comprise image data combined from multiple previously captured images. The stored image data may also comprise metadata indicating where stored information originates.

Figure 4A:
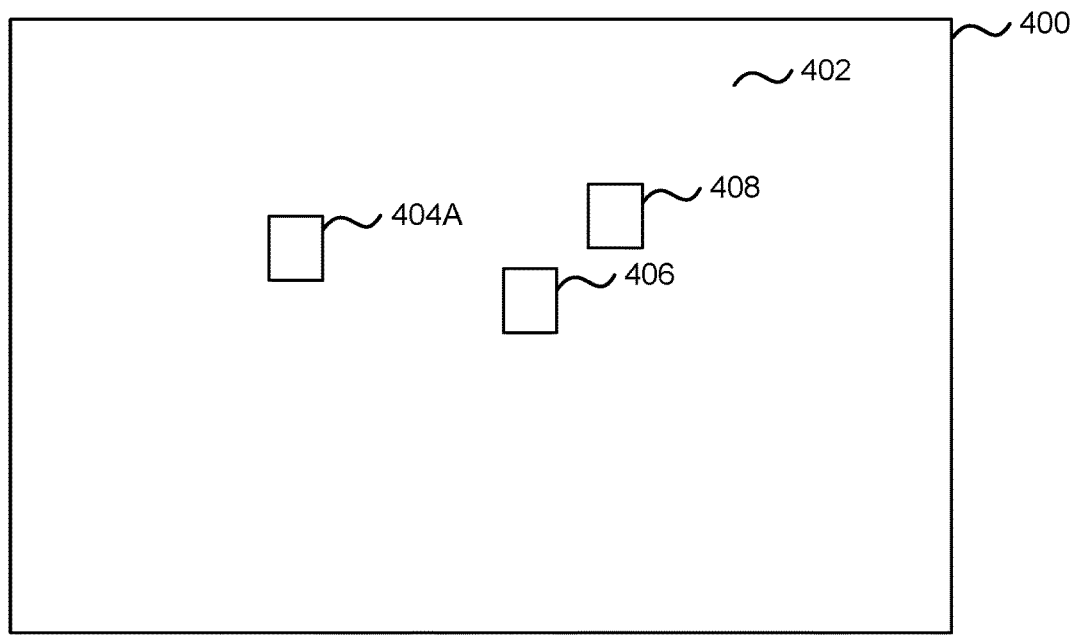
FIG. 4A is a simplified live viewfinder feed provided on a display of a camera apparatus according to one embodiment.

FIG. 4A illustrates a view on a display of an apparatus according to another embodiment. The apparatus may be any apparatus comprising a digital camera, for example, a computer, a tablet computer, a smart phone, a digital camera etc. A display 400 of the apparatus provides a live viewfinder 402 providing a live view feed of a scene to be photographed. In other words, when a user changes the shooting direction with the apparatus, the live view feed in the live viewfinder 402 changes accordingly.

FIG. 4A illustrates a simplified example where rectangles 404A, 406, 408 represent faces within a scene to be captured or photographed. A set of captured image is obtained using the digital camera. The captured digital still images may be captured in response to user initiation or automatically without user actions. Face detection may be performed based on the full resolution image or alternatively on lower resolution images displayed by the live viewfinder 402, and any possible process or technique for detecting the faces from the captured images may be used.

Figure 4B:
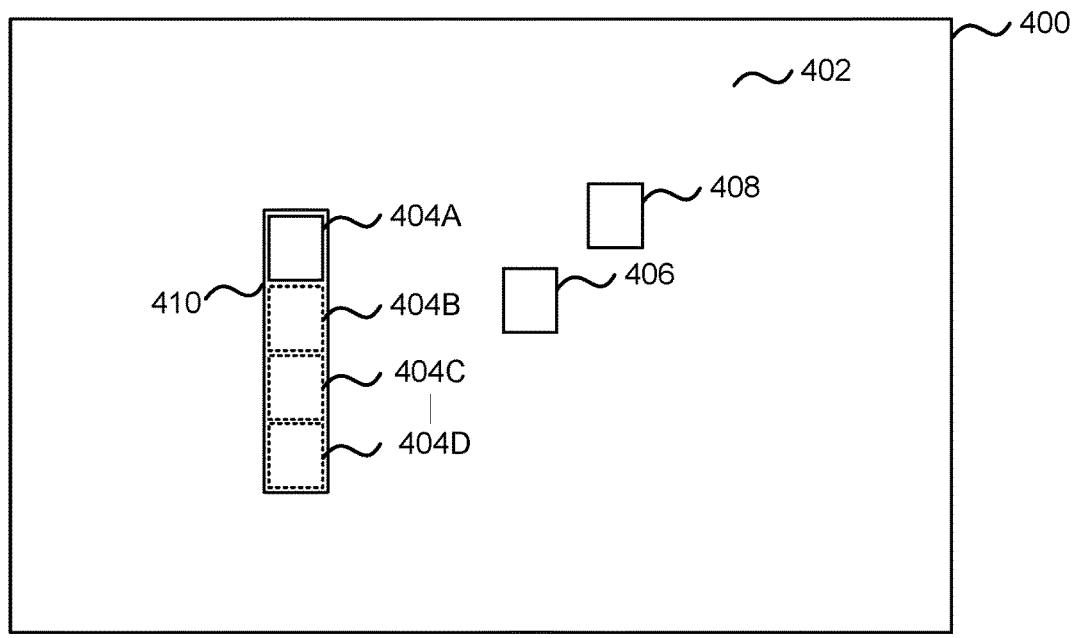
FIG. 4B is a simplified live viewfinder feed provided on a display of a camera apparatus according to another embodiment.

FIG. 4B illustrates another possibility for providing digital still image candidates relating to faces (represented by rectangles 404A, 406, 408) in the scene to be captured or photographed.

In one embodiment, the rectangles 404A, 404, 408 show the live viewfinder data (i.e. live moving data). But, when the user touches the face (represented by the rectangle 404A) of a specific person, the user is provided with digital still image (face) candidates 404B, 404C, 404D in a display element 410. Although FIG. 4B illustrates that the digital still image candidates 404B, 404C, 404D are provided as a list of candidates in the display element 410, any other way of providing or displaying the candidates may be used. If there are more than three candidates available, the user may scroll though the images by providing, for example, a sliding operation with his finger on any of the three still image candidates 404B, 404C, 404D.

In one embodiment, the display element 410 may display the faces after an analysis. The apparatus may be configured to analyze the detected faces of each person in the captured still images and sort or rank the set of candidate faces for each person based on the analysis. For example, the analysis may be based on at least one of the following: a posing angle, smiling level, and eye opening status. As an example, the apparatus may have stored 10 images, thus resulting in 10 candidate faces for a specific user. Based on the analysis, the apparatus may be configured to sort or rank the candidate faces to a specific order. In one embodiment, all the candidate faces as given as alternatives in a sorted order for a user of the apparatus. In another embodiment, the apparatus may be configured to provide only a subset of the full set of candidate faces for each person with the display element 410.

Once the user has selected one of the digital still image candidates 404B, 404C, 404D, the selected still image may replace the corresponding section 404A in the live viewfinder feed. In another embodiment, the corresponding section 404A in the live viewfinder feed may continue providing live data relating to the scene to be photographed, but the selected still image candidate may be provided in the vicinity of the corresponding the face (represented by the rectangle 404A).

Once all the necessary selections have been done, the user may provide an indication with the apparatus that digital still image is to be stored by the apparatus with the selections made by the user. The indication may be provided, for example, via the touch-sensitive display by selecting a button displayed on the touch-sensitive display. The stored image data may thus comprise image data combined from multiple previously captured images. The stored image data may also comprise metadata indicating where stored information originates.

In another embodiment of FIG. 4A, the user may initiate an automatic shooting mode with the apparatus. In order to initiate the automatic shooting mode, the user may be required to continuously press the shutter release button. In another embodiment, it is enough that the user initiates the automatic shooting mode via a single press of the shutter release button or some other activation button. Depending on the apparatus, the shutter release button may be a mechanical button or a software button provided by a touch-sensitive display of the apparatus.

In the automatic shooting mode, the apparatus automatically captures without additional user actions a set of digital still images. While providing the live viewfinder 402 feed with the display 400, the apparatus starts to automatically "lock" faces of each person in the live viewfinder 402 feed. The term "locking" here means that software executed by the apparatus analyses facial features for each person in the set of captured images and determines in which captured image facial expressions for a specific person are the most promising (for example, smiling and eyes clearly open). When the software has determined the most promising face for a person corresponding to the rectangle 404A, the determined most promising face replaces the facial section for this person in the live viewfinder 402. This process may continue until all faces in the live viewfinder 402 feed have been replaced with facial data from the set of captured digital still images. It may happen that facial features of a first person is taken from a first captured image, facial features of a second person is taken from a second captured image or some other image etc.

In one embodiment, the apparatus is configured to provide an indication (for example, a sound or an indication on the display 400) that all faces in the live viewfinder 402 have now been replaced (or "locked") with facial data from the set of captures still images. After this, image data comprising the replaced (or "locked") facial data may be automatically stored by the apparatus, or alternatively the apparatus may seek storing confirmation from the user.

In a further embodiment, although the apparatus may in the automatic shooting mode automatically lock faces of each person in the live viewfinder 402 feed, one or more of the locked faces may still change to another one during the automatic shooting mode if digital still images captured after the locking provide better alternatives than the already locked ones.

In a yet further embodiment, although the apparatus may in the automatic shooting mode automatically lock faces of each person in the live viewfinder 402, one or more of the locked faces may still be changed. For example, a user may change a locked face by operating the touch-sensitive display proving the live viewfinder feed. For example, the user may provide a sliding operation with his finger from left to right (or right to left) on a locked face. This causes the face to change to another face candidate obtained from previously captured digital still images. The face changing process may be performed for some or all of the locked faces in the live viewfinder feed.

The above described automatic shooting mode provides an efficient and an easy solution for enabling capturing and storing of a digital still image where facial expressions of the persons in the digital still image are most likely better than in any single shot digital image.

In any of the embodiments illustrated above, before replacing the face of a person in the live viewfinder feed on the display with the selected candidate face, it is possible to process the candidate face. For example, the selected candidate face may be rotated or warped so that it better fits to replace the face of the person in the live viewfinder feed. In other words, the selected candidate face may be processed, for example, warped to match any changes in camera angle or the person's posture or direction.

In any of the embodiments illustrated above, a candidate face's ranking may go down or it may be discarded completely or temporarily if the camera angle or direction or a user's direction changes too much, resulting in, for example, too significant distortion in a nose angle. If the camera angle or the user's direction becomes acceptable again, the candidate face may become available again or regain its ranking position Any combination of the following examples is within the scope of the disclosure.

According to an aspect, there is provided an apparatus comprising at least one processing unit and at least one memory. The at least one memory stores program instructions that, when executed by the at least one processing unit, cause the apparatus to obtain a set of captured still images captured with a camera, detect at least one face in the captured still images, and cause display of the detected at least one face on a display providing a live viewfinder feed of a scene to be captured as an additional display element while providing the live viewfinder feed on the display.

In one embodiment, the at least one memory stores program instructions that, when executed by the at least one processing unit, cause the apparatus to receive a first user action via the display providing the live viewfinder feed, wherein the display is a touch-sensitive display, provide with the additional display element a set of candidate faces for a specific person in response to the first user action, the candidate faces originating from the set of captured still images, receive a selection of a desired candidate face from the user, and cause display of the selected candidate face on the display providing the live viewfinder feed, the selected candidate face replacing the face of a corresponding or same person in the live viewfinder feed on the display.

In one embodiment, the at least one memory stores program instructions that, when executed by the at least one processing unit, cause the apparatus to receive a second user action, and scroll through the set of candidate faces for the specific person in response to the second user action.

In one embodiment, the at least one memory stores program instructions that, when executed by the at least one processing unit, cause the apparatus to analyze the detected faces of the specific person in the captured still images, and sort the set of candidate faces for the specific person based on the analysis.

In one embodiment, alternatively or in addition, the at least one memory stores program instructions that, when executed by the at least one processing unit, cause the apparatus to analyze the detected faces of the specific person in the captured still images based on at least one of the following: a posing angle, smiling level, and eye opening status.

In one embodiment, alternatively or in addition, the at least one memory stores program instructions that, when executed by the at least one processing unit, cause the apparatus to receive a third user action to store a still image where a candidate face has been selected for all persons in the captured still images, and store the still image.

In one embodiment, alternatively or in addition, the apparatus comprises the display.

According to an aspect, there is provided an apparatus comprising at least one processing unit and at least one memory. The at least one memory stores program instructions that, when executed by the at least one processing unit, cause the apparatus to obtain a set of captured still images captured with a camera, detect a face of a person in the captured still images, automatically select without user input a candidate face for the person from the detected faces for the person in the captured still images, and cause display of the selected candidate face on a display providing a live viewfinder feed of a scene to be captured, the selected candidate face replacing the face of the person in the live viewfinder feed on the display.

In one embodiment, the at least one memory stores program instructions that, when executed by the at least one processing unit, cause the apparatus to provide an indication in connection with the selected candidate face, the indication indicating to the user that the selected candidate face has been automatically selected.

In one embodiment, alternatively or in addition, the at least one memory stores program instructions that, when executed by the at least one processing unit, cause the apparatus to receive a first user action on the displayed candidate face via the display providing the live viewfinder feed, wherein the display is a touch-sensitive display, provide a set of additional candidate faces for a specific person in response to the first user action, the candidate faces originating from the set of captured still images, receive a second user action, and scroll through the set of additional candidate faces for the specific person in response to the second user action.

In one embodiment, alternatively or in addition, the at least one memory stores program instructions that, when executed by the at least one processing unit, cause the apparatus to receive a selection of an additional candidate face from the set of additional candidates, and replace the selected candidate face with the selected additional candidate face in the live viewfinder feed on the display.

In one embodiment, alternatively or in addition, the at least one memory stores program instructions that, when executed by the at least one processing unit, cause the apparatus to provide an indication to the user via the display that a candidate face has been automatically selected for all persons in the captured still images.

In one embodiment, alternatively or in addition, the at least one memory stores program instructions that, when executed by the at least one processing unit, cause the apparatus to receive an input from the user to store a still image where a candidate face has been automatically selected for all persons in the captured still images, and store the still image.

In one embodiment, alternatively or in addition, the at least one memory stores program instructions that, when executed by the at least one processing unit, cause the apparatus to automatically store without user actions a still image comprising a candidate face selected for all persons in the captured still images when a candidate face has been automatically selected for all persons in the captured still images.

In one embodiment, alternatively or in addition, the at least one memory stores program instructions that, when executed by the at least one processing unit, cause the apparatus to automatically select without user input the candidate face based on at least one of the following: a posing angle, smiling level, and eye opening status.

In one embodiment, alternatively or in addition, the at least one memory stores program instructions that, when executed by the at least one processing unit, cause the apparatus to replace a face of each person in the live viewfinder feed on the display with a selected candidate face for each person.

In one embodiment, alternatively or in addition, the apparatus comprises the display.

According to another aspect, there is provided a method comprising obtaining a set of captured still images captured with a camera, detecting at least one face in the captured still images, and causing display of the detected at least one face on a display providing a live viewfinder feed of a scene to be captured as an additional display element while providing the live viewfinder feed on the display.

In one embodiment, the method further comprises receiving a first user action via the display providing the live viewfinder feed, wherein the display is a touch-sensitive display, providing with the additional display element a set of candidate faces for a specific person in response to the first user action, the candidate faces originating from the set of captured still images, receiving a selection of a desired candidate face from the user, and causing display of the selected candidate face on the display providing the live viewfinder feed, the selected candidate face replacing the face of a corresponding or same person in the live viewfinder feed on the display.

In one embodiment, the method further comprises receiving a second user action, and scrolling through the set of candidate faces for the specific person in response to the second user action.

In one embodiment, the method further comprises analyzing the detected faces of the specific person in the captured still images, and sorting the set of candidate faces for the specific person based on the analysis.

In one embodiment, the method further comprises receiving a third user action to store a still image where a candidate face has been selected for all persons in the captured still images, and storing the still image.

According to another aspect, there is provided a method comprising obtaining a set of captured still images captured with a camera, detecting a face of a person in the captured still images, automatically select without user input a candidate face for the person from the detected faces for the person in the captured still images, and causing display of the selected candidate face on a display providing a live viewfinder feed of a scene to be captured, the selected candidate face replacing the face of the person in the live viewfinder feed on the display.

In one embodiment, the method further comprises providing an indication in connection with the selected candidate face, the indication indicating to the user that the selected candidate face has been automatically selected.

In one embodiment, the method further comprises receiving a first user action on the displayed candidate face via the display providing the live viewfinder feed, wherein the display is a touch-sensitive display, providing a set of additional candidate faces for a specific person in response to the first user action, the candidate faces originating from the set of captured still images, receiving a second user action, and scrolling through the set of additional candidate faces for the specific person in response to the second user action.

In one embodiment, the method further comprises receiving a selection of an additional candidate face from the set of additional candidates, and replacing the selected candidate face with the selected additional candidate face in the live viewfinder feed on the display.

In one embodiment, the method further comprises providing an indication to the user via the display that a candidate face has been automatically selected for all persons in the captured still images.

In one embodiment, the method further comprises receiving an input from the user to store a still image where a candidate face has been automatically selected for all persons in the captured still images, and storing the still image.

In one embodiment, the method further comprises automatically storing without user actions a still image comprising a candidate face selected for all persons in the captured still images when a candidate face has been automatically selected for all persons in the captured still images.

In one embodiment, alternatively or in addition, the method comprises automatically selecting without user input the candidate face based on at least one of the following: a posing angle, smiling level, and eye opening status.

In one embodiment, alternatively or in addition, the method further comprises replacing a face of each person in the live viewfinder feed on the display with a selected candidate face for each person.

According to an aspect, there is provided an apparatus comprising means for obtaining a set of captured still images captured with a camera, means for detecting at least one face in the captured still images, and means for causing display of the detected at least one face on a display providing a live viewfinder feed of a scene to be captured as an additional display element while providing the live viewfinder feed on the display.

According to an aspect, there is provided an apparatus comprising means for obtaining a set of captured still images captured with a camera, means for detecting a face of a person in the captured still images, means for automatically select without user input a candidate face for the person from the detected faces for the person in the captured still images, and means for causing display of the selected candidate face on a display providing a live viewfinder feed of a scene to be captured, the selected candidate face replacing the face of the person in the live viewfinder feed on the display.

According to another aspect, there is provided a computer program comprising program code, which when executed by at least one processor, causes an apparatus to obtain a set of captured still images captured with a camera, detect at least one face in the captured still images, and cause display of the detected at least one face on a display providing a live viewfinder feed of a scene to be captured as an additional display element while providing the live viewfinder feed on the display.

In one embodiment, the computer program is embodied on a computer-readable medium.

According to another aspect, there is provided a computer program comprising program code, which when executed by at least one processor, causes an apparatus to obtain a set of captured still images captured with a camera, detect a face of a person in the captured still images, automatically select without user input a candidate face for the person from the detected faces for the person in the captured still images, and cause display of the selected candidate face on a display providing a live viewfinder feed of a scene to be captured, the selected candidate face replacing the face of the person in the live viewfinder feed on the display.

In one embodiment, the computer program is embodied on a computer-readable medium.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices such as disks, thumb drives, memory etc. and do not include propagated signals. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus, comprising:
   at least one processing unit;
   at least one memory;
   wherein the at least one memory stores program instructions that, when executed by the at least one processing unit, cause the apparatus to:
      obtain a set of captured still images captured with a camera;
      detect at least one face in the captured still images;

cause display of the detected at least one face on a display providing a live viewfinder feed of a scene to be captured as an additional display element while providing the live viewfinder feed on the display;

provide with the additional display element a set of candidate faces for a specific person in response to a first user action, the candidate faces originating from the set of captured still images;

receive a selection of a desired candidate face from a user; and cause display of the selected candidate face on the display providing the live viewfinder feed, the selected candidate face replacing the face of a corresponding person in the live viewfinder feed on the display.

2. An apparatus according to claim 1, wherein the at least one memory stores program instructions that, when executed by the at least one processing unit, cause the apparatus to:

receive the first user action via the display providing the live viewfinder feed, wherein the display is a touch-sensitive display.

3. An apparatus according to claim 1, wherein the at least one memory stores program instructions that, when executed by the at least one processing unit, cause the apparatus to:

receive a second user action; and scroll through the set of candidate faces for the specific person in response to the second user action.

4. An apparatus according to claim 1, wherein the at least one memory stores program instructions that, when executed by the at least one processing unit, cause the apparatus to:

analyze the detected faces of the specific person in the captured still images; and sort the set of candidate faces for the specific person based on the analysis.

5. An apparatus according to claim 4, wherein the at least one memory stores program instructions that, when executed by the at least one processing unit, cause the apparatus to:

analyze the detected faces of the specific person in the captured still images based on at least one of the following: a posing angle, smiling level, and eye opening status.

6. An apparatus according to claim 1, wherein the at least one memory stores program instructions that, when executed by the at least one processing unit, cause the apparatus to:

receive a third user action to store a still image where a candidate face has been selected for all persons in the captured still images; and store the still image.

7. An apparatus according to claim 1, wherein the apparatus comprises the display.

8. An apparatus, comprising:

at least one processing unit;

at least one memory;

wherein the at least one memory stores program instructions that, when executed by the at least one processing unit, cause the apparatus to:

obtain a set of captured still images captured with a camera;

detect a face of a person in the captured still images;

automatically select without user input a candidate face for the person from the detected faces for the person in the captured still images; and cause display of the selected candidate face on a display providing a live viewfinder feed of a scene to be captured, the selected candidate face replacing the face of the person in the live viewfinder feed on the display.

9. An apparatus according to claim 8, wherein the at least one memory stores program instructions that, when executed by the at least one processing unit, cause the apparatus to:

provide an indication in connection with the selected candidate face, the indication indicating to the user that the selected candidate face has been automatically selected.

10. An apparatus according to claim 8, wherein the at least one memory stores program instructions that, when executed by the at least one processing unit, cause the apparatus to:

receive a first user action on the displayed candidate face via the display providing the live viewfinder feed, wherein the display is a touch-sensitive display;

provide a set of additional candidate faces for a specific person in response to the first user action, the candidate faces originating from the set of captured still images;

receive a second user action; and scroll through the set of additional candidate faces for the specific person in response to the second user action.

11. An apparatus according to claim 10, wherein the at least one memory stores program instructions that, when executed by the at least one processing unit, cause the apparatus to:

receive a selection of an additional candidate face from the set of additional candidates; and replace the selected candidate face with the selected additional candidate face in the live viewfinder feed on the display.

12. An apparatus according to claim 8, wherein the at least one memory stores program instructions that, when executed by the at least one processing unit, cause the apparatus to:

provide an indication to the user via the display that a candidate face has been automatically selected for all persons in the captured still images.

13. An apparatus according to claim 12, wherein the at least one memory stores program instructions that, when executed by the at least one processing unit, cause the apparatus to:

receive an input from the user to store a still image where a candidate face has been automatically selected for all persons in the captured still images; and store the still image.

14. An apparatus according to claim 8, wherein the at least one memory stores program instructions that, when executed by the at least one processing unit, cause the apparatus to:

automatically store without user actions a still image comprising a candidate face selected for all persons in the captured still images when a candidate face has been automatically selected for all persons in the captured still images.

15. An apparatus according to claim 8, wherein the at least one memory stores program instructions that, when executed by the at least one processing unit, cause the apparatus to:

automatically select without user input the candidate face based on at least one of the following: a posing angle, smiling level, and eye opening status.

16. An apparatus according to claim 8, wherein the at least one memory stores program instructions that, when executed by the at least one processing unit, cause the apparatus to:

replace a face of each person in the live viewfinder feed on the display with a selected candidate face for each person.

17. An apparatus according to claim 8, wherein the apparatus comprises the display.

18. A method comprising:

obtaining a set of captured still images captured using an apparatus comprising a camera;

detecting a face of a person in the captured still images;

automatically selecting without user input a candidate face for the person from the detected faces for the person in the captured still images; and causing display of the selected candidate face on a display providing a live viewfinder feed of a scene to be captured, the selected candidate face replacing the face of the person in the live viewfinder feed on the display.

19. A method according to claim 18, further comprising:

receiving a first user action on the displayed candidate face via the display providing the live viewfinder feed, wherein the display is a touch-sensitive display;

providing a set of additional candidate faces for a specific person in response to the first user action, the candidate faces originating from the set of captured still images;

receiving a second user action; and scrolling through the set of additional candidate faces for the specific person in response to the second user action.

20. A method according to claim 18, further comprising:

automatically storing without user actions a still image comprising a candidate face selected for all persons in the captured still images when a candidate face has been automatically selected for all persons in the captured still images.

\* \* \* \* \*